United States Patent [19]

Futatsudera et al.

[11] 4,432,018

[45] Feb. 14, 1984

[54] EXPLOSION PROOF CATHODE-RAY TUBE

[75] Inventors: Masaomi Futatsudera, Menuma; Syoichi Yokoyama, Hanyu; Osamu Yasutome, Fukaya, all of Japan

[73] Assignee: Tokyo Shibaura Denki Kabushiki Kaisha, Kawasaki, Japan

[21] Appl. No.: 378,731

[22] Filed: May 17, 1982

[30] Foreign Application Priority Data

May 21, 1981 [JP] Japan ........ 56-75741

[51] Int. Cl.[3] ........ H04N 5/65

[52] U.S. Cl. ........ 358/246; 220/2.1 A

[58] Field of Search ........ 358/245, 246; 220/2.1 A

[56] References Cited

U.S. PATENT DOCUMENTS

| | | | |
|---|---|---|---|
| 2,797,408 | 6/1957 | Greatbatch | 358/245 |
| 4,031,553 | 6/1977 | Sumiyoshi | 358/246 |

FOREIGN PATENT DOCUMENTS

| | | | |
|---|---|---|---|
| 2926 | 7/1979 | European Pat. Off. | 358/245 |
| 2240735 | 2/1973 | Fed. Rep. of Germany | 358/246 |

*Primary Examiner*—Howard Britton

*Attorney, Agent, or Firm*—Cushman, Darby & Cushman

[57] ABSTRACT

An explosion proof cathode-ray tube comprises an envelope having a faceplate, a funnel, and a neck; an adhesive tape which is wound around the side walls of the faceplate and which contains solid particles; and a metal tape which is wound around the adhesive tape.

5 Claims, 6 Drawing Figures

EXPLOSION PROOF CATHODE-RAY TUBE

BACKGROUND OF THE INVENTION

The present invention relates to an explosion proof cathode-ray tube which has a metal band wound on side walls of a faceplate through an adhesive layer.

According to the general means for rendering a cathode-ray tube explosion proof, a metal band 6 is fastened onto side walls 5 of a faceplate 1 of an envelope 4 further having a funnel 2 and a neck 3 as shown in FIGS. 1(A) and 1(B). The metal band 6 is fastened by various methods. For example, a metal band is wound around the side walls of the faceplate, the metal band is mechanically fastened, and the overlapping part of the metal band is welded. According to another method, after winding a metal band on the side walls of the faceplate, the band is expanded under heating and then welded, and the band is fastened by shrinkage during cooling. Still another method is known wherein a ring of metal band having the circumference slightly shorter than the outer circumference of the side walls of the faceplate is fitted over the side walls of the faceplate after being heated for expansion, and the ring is fastened by shrinkage during cooling. In any of these methods, the metal band 6 is fastened indirectly over the side walls of the faceplate through an adhesive tape 7 so as to prevent formation of cracks in the envelope 4 and misalignment of the metal band 6.

However, when the adhesive tape 7 is used, the adhesive on the tape 7 may be squeezed out of the metal band 6 before hardening and the metal band 6 may be locally brought into direct contact with the faceplate 1.

Another method has also been proposed wherein a base tape 8 of a polyester-type resin or the like with adhesive layers 9 of an acrylic-type resin formed on its both surfaces is wound on the side walls 5 of the faceplate 1, as shown in FIG. 3. However, as shown in FIG. 1(A), the side walls 5 of the faceplate 1 are inclined toward the neck 3 due to the design requirement of the envelope 4. Furthermore, the envelope 4 is securely held onto a television receiver by means of lugs 10 mounted at four corners of the faceplate 1. For this reason, a considerale load acts on the metal band 6, causing misalignment of the metal band 6 over time. In order to prevent this misalignment, it may be possible to roughen the surfaces of the side walls or the metal band. However, this means a necessity of secondary processing and is not preferable from the viewpoint of manufacturing cost. Furthermore, it has also been proposed to use an adhesive tape 7 with an adhesive layer 9 having glass fiber 11 embedded therein (Japanese Patent Publication No. 56-34984). This method also suffers from the problem of fraying of the glass fiber 11 from ends of the tape when the tape is cut into a certain length or the problem of working environment due to scattering of the glass fiber upon cutting.

SUMMARY OF THE INVENTION

It is, therefore, an object of the present invention to provide an explosion proof cathode-ray tube wherein the metal band may not be misaligned.

In accordance with an aspect of the present invention, there is provided an explosion proof cathode-ray tube comprising an envelope having a faceplate, a funnel and a neck; an adhesive tape which is wound around side walls of said faceplate and which contains solid particles; and a metal tape which is wound around said adhesive tape.

DETAILED DESCRIPTION OF THE PREFERRED EMBODIMENTS

Figure 1A:
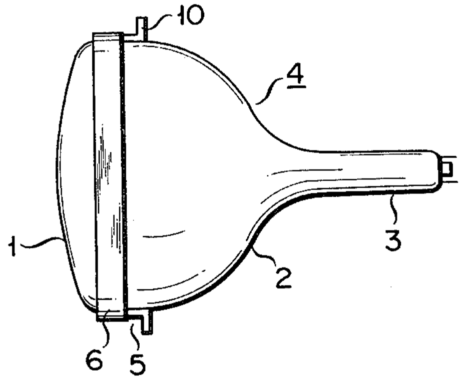
FIG. 1(A) and 1(B) are a side view and a front view of a cathode-ray tube, respectively, for explaining the method for rendering the tube explosion proof.
Figure 1B:
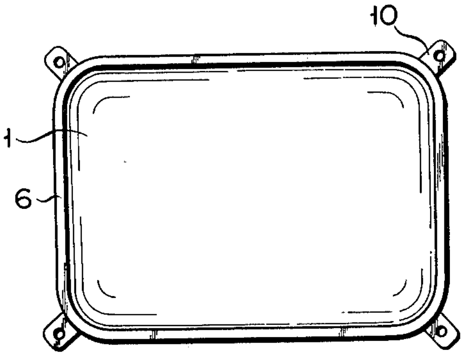
Figure 2:
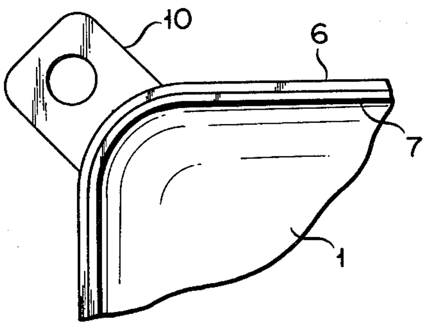
FIG. 2 is a partial, enlarged view of the tube shown in FIG. 1(A)
Figure 3:
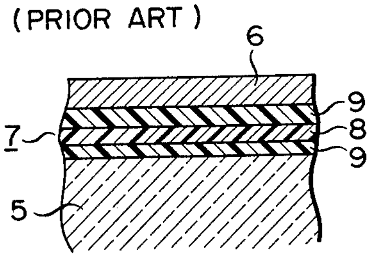
FIG. 3 (PRIOR ART)
FIG. 3 and 4 are enlarged sectional views showing the structures of conventional adhesive tapes.
Figure 4:
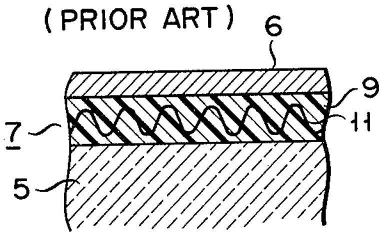
FIG. 4 (PRIOR ART)
Figure 5:
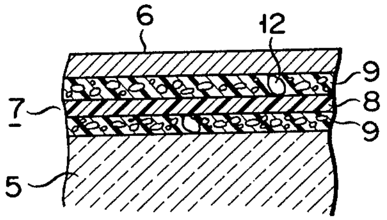
FIG. 5 is an enlarged sectional view showing an adhesive tape used in an explosion proof cathode-ray tube according to an embodiment of the present invention.

An embodiment of the present invention will now be described with reference to FIG. 5. The adhesive tape 7 consists of the base tape 8, the adhesive layers 9 coated on both surfaces of the base tape 8, and solid particles 12 mixed in the adhesive layers 9. From the viewpoint of cutting efficiency, the base tape is preferably made of a polyester-type film. In this embodiment, the base tape is a polyester tape of 0.075 mm thickness. The adhesive layer 9 preferably consists of an acrylic- or rubber-type adhesive. In this embodiment, the adhesive layer 9 consists of a thermosetting acrylic-type resin and the adhesive tape 7 has a thickness of 0.25 mm. In this embodiment, the solid particles 12 are siliceous sand having an average particle size of 0.075 mm. The surface of the adhesive tape 7 is rough. When the metal band 6 is fastened over the side walls of the faceplate 1 through the adhesive tape 7, the solid particles catch the surface of the base tape by the fastening pressure. Therefore, even if the tape itself is subject to expansion or shrinkage, the metal band may not be misaligned. This has been confirmed by various tests. The solid particles may be inorganic materials such as metals, metal compounds, metal oxides, or ceramics, as long as they may not be deformed by heat, are capable of withstanding external loads to some extent, do not cause material changes over time, are inexpensive and are easy to work with. Although the solid particles preferably have a high hardness from the viewpoint of the original purpose, they must have a hardness which may not cause damage to the glass faceplate. The particle size of the solid particles must not be too great or too small. From the experiments conducted, it was confirmed that the particle size is preferably within the range of the thickness of the adhesive tape from the viewpoints of quality stability and workability. According to the present invention, the solid particles preferably have an average particle size of 30 to 200 μm.

The present invention is not limited to the particular embodiment described above. For example, the adhesive layer containing solid particles may be formed only on one surface of the base tape. The solid particles may be coated on the surface or surfaces of the adhesive layer or adhesive layers which is or are coated on the base tape. The advantageous effects of the present invention may be similarly obtained even if the solid particles are mixed in the base tape as well as in the adhesive layer.

The present invention may be similarly applied to a case wherein a rim band is wound around the adhesive tape, and a tension band is wound around the rim band for fastening.

The same reference numerals denote the same parts throughout FIGS. 1 to 5.

What we claim is:

1. An explosion proof cathode-ray tube comprising:

an envelope having a faceplate, a funnel, and a neck;

an adhesive tape which is wound around side walls of said faceplate and which contains solid particles; and a metal tape which is wound around said adhesive tape.

2. A tube according to claim 1, wherein said adhesive tape comprises a base tape and an adhesive layer formed on at least one surface of said base tape.

3. A tube according to claim 2, wherein said solid particles are mixed within said adhesive layer.

4. A tube according to claim 2, wherein said solid particles are mixed within said base tape.

5. A tube according to claim 1 or 2, wherein said solid particles have a particle size which is not greater than a thickness of said adhesive tape.

* * * * *